UNITED STATES PATENT OFFICE 2,534,307

KETENE-ALDEHYDE MODIFIED ALKYD MIXED ESTERS

Leon Shechter, East Orange, and John M. Whelan, Jr., Lyndhurst, N. J., assignors, by mesne assignments, to Union Carbide and Carbon Corporation, a corporation of New York No Drawing. Application June 8, 1948, Serial No. 31,848

12 Claims. (Cl. 260—23)

This invention relates to mixed esters or alkyds or polyhydric alcohols or mixtures of polyhydric alcohols that have a resultant functionality of more than two in order to yield films convertible to a hard dry state and so useful for coatings.

Mixed esters so characterized, and known as alkyds, depend upon the inclusion of a dicarboxylic acid as an acid reactant to give polyesters of resinous character; in order to impart oxidizing or drying properties to such resins, unsaturated monobasic acids of drying fatty oils are also included as acid reactants (Ellis, "The Chemistry of Synthetic Resins" (1935), page 864, lines 4–8; chapter 44). These alkyds, however, have serious limitations: one in particular is a characteristic skin-drying of the film that leaves a soft body under the skin; another is failure to dry or oxidize completely in a reasonable time period; and a third is a tendency to mar easily.

It has now been found that the reaction product preferably obtained from approximately equimolecular proportions of ketene and an unsaturated aldehyde by their introduction into an inert solvent containing a Friedel-Crafts catalyst at low temperatures, is surprisingly effective in improving alkyd resins; the unsaturated aldehydes are those of the acrylic series having the general structure $R_1—CR_2=CR_3—CHO$ wherein $R_1$, $R_2$ and $R_3$, can be hydrogen or monovalent aliphatic, alicyclic, aryl or aralkyl groups, such aldehydes being acrolein, crotonaldehyde, 2,4-hexadienal-1, octatrienal, cinnamic aldehyde, etc. An alkyd resin prepared by reaction with a polyhydric alcohol of such a product and a dicarboxylic acid, with or without the further inclusion of an unsaturated monobasic fatty oil acid, can be formulated into enamels, for example, to yield films that air-dry in a remarkably fast time period into through-hardened, mar-resistant and glossy coatings more closely approaching high-quality baked ceramic coatings than has heretofore been thought possible with organic coatings. Because of the high speed of drying imparted by the polymer reactant, the amount of metallic drier is greatly reduced and can even be omitted entirely in many cases; this is important, since the presence of driers decreases the durability of the film and oxidation tends to continue to deteriorate the film, and it is especially important when phthalic anhydride is the dicarboxylic acid reactant, since phthalic alkyds have poor tolerance for some conventional driers.

Both the temperature of the ketene-unsaturated aldehyde reaction and the type of catalyst appear to be directive influences in controlling the character of the product. At temperatures of 60° to 70° C. and an acid catalyst of the $X—SO_3H$ type ($X$ being a non-metallic atom other than hydrogen), acyl-oxydienes (O—C linkage) apparently predominate (Agett, U. S. 2,421,976). Low temperatures of —50° to +30° C. and a Friedel-Crafts catalyst, particularly boron trifluoride, aluminum chloride and zinc chloride, direct the building on of more carbons (C—C linkage) to the aldehyde; other catalysts that operate to yield products of this nature are found to be the activated clays characterized by containing hydrous aluminum silicate.

Typical of the general reaction is that of ketene and crotonaldehyde. In the presence of about 0.1 to 0.5 gram of boron trifluoride for a mole of reactant and methyl-butyl ether as an inert organic solvent (included in amount to control the viscosity) and at a temperature between 5° and 10° C., the reaction product of

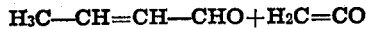

may be considered under these conditions to be a monomer unit having the C—C linkage

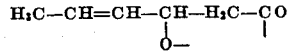

that polymerizes by addition to

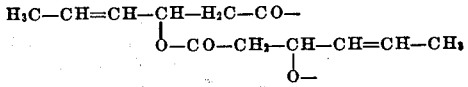

The dangling terminal valences are probably satisfied by the conversion of the carbonyl groups to carboxyls and of the oxygens to hydroxyls, or by unsaturation resulting from dehydration of the so converted hydroxyl chain end. After the completion of the reaction the catalyst is destroyed by washing the solution with a small amount of water and alkali, when a Friedel-Crafts type of catalyst is used; with the earth type catalyst, it is merely filtered out of the solution.

A chemical investigation of the foregoing reaction product showed but very little free monomeric acid (less than 2%) and the presence of polymeric esters of 3-hydroxy-hex 4-en 1-oic and 4- or 5-hydroxy-hex 2-en 1-oic acids. The total yield of polymeric material was in excess of 95 per cent, and hydrogenation thereof yielded about 80 per cent of the six-carbon acids: caproic 40–45 per cent, delta caprolactone 10–15 per cent, trans-hexen-2-oic 15–25 per cent, and other products. These esters were of a low degree of polymerization (probably under 5 and an average of about 2.5). The saponification numbers (e. g. 628), however, were found to be considerably higher than expected from the polymeric esters (calculated 501), thus indicating some form of terminal carboxyl group reaction with other ingredients present in the mass. That the reaction product, moreover, can be regarded as being primarily a polymeric ester, corresponding to the condensation of the hydroxy group of a hydroxymonocarboxylic acid molecule with the acid group of another molecule, also appears from the observation that the product reacts much more slowly with glycerol than the monomer acid unit.

As noted above, drying or oxidizing alkyds are conventionally prepared by reacting glycerol or higher polyhydric alcohol with a dicarboxylic acid or anhydride and modified by the inclusion of a drying oil fatty acid; the unsaturated polymers are found to be compatible and to react in these alkyd-forming reactions. Accordingly a wide range of products and properties is available depending on the selection of components, molar ratios and degree of reaction. An advantage lies in the fact that the polymer contributes very little to the acid value of the alkyd, either in the processing or in the final product, for the acid groups are in a more or less completely esterified condition. No material change in the procedure of preparing alkyds is then found necessitated by the inclusion of the polymer.

It is difficult to set limits for the amounts of polymer that can be added in preparing the alkyds. The stoichiometric relations are calculated on the assumption that the polymer behaves as an acid of the equivalent weight of the ketene plus the aldehyde; the reaction product of ketene and crotonaldehyde, for instance, is regarded as behaving like an acid having the molecular weight of 112. On this assumption the amount of polymer for conferring noticeable advantages is a quantity such that four per cent of the total carboxylic equivalents charged is contributed by the polymer. Optimum results in the phthalic-glycerol series on the same basis are obtained at about eleven per cent. As the quantity of polymer approaches one hundred per cent of the total carboxylic equivalents charged, the reaction conditions require closer control, and the character of the product begins to change; in the neighborhood of 80 to 100 per cent polymer, the resultant esterified product on conversion is hard and brittle in nature, thus tending to make a less desirable coating composition. In general the useful range appears to lie within four to forty per cent of the carboxylic charge.

In the examples which follow to illustrate the invention, the polymer obtained from equimolecular parts of crotonaldehyde and ketene was selected as typical of all of them; the other polymers contemplated by this invention function exactly the same in the alkyd resin reaction, when in the same molar ratio, with variations in reaction speed and operating conditions dictated by the substituents on the chain. The polymer was not isolated; but the crude reaction product of the aldehyde and ketene was used.

*Example 1.—Twenty per cent of total carboxyl contributed by polymer*

|  | Grams |
|---|---|
| Polymer solution (41.7% solids in isopropyl ether) solids | 67.2 |
| Phthalic anhydride | 133.0 |
| Linseed monoglyceride | 212.0 |
| Glycerol, 98% | 48.8 |

The first three ingredients were stirred in an inert atmosphere and heated to 180° C., the isopropyl ether boiling off. The glycerol was added, temperature brought to 200° C., and held for one hour. Xylene was added in sufficient quantity to give a moderate rate of reflux at 190° C., and water was removed from the reflux by means of a separator; this temperature was maintained (7 hours) until a one gram sample spread on a hot plate at 200° C. gelled in 25 seconds. A further quantity of xylene was added, giving a reflux temperature of 165° C.; this was held (6 hours) for a gel test (as above) of 20 seconds. The alkyd product was thinned to 50 per cent solids with xylene and butanol, 5 per cent butanol on alkyd solids being used. The product was a bright and clear liquid of color 9 Gardner, viscosity I Gardner-Holdt, and acid value 2.31.

Films of this material, baked without drier for one hour at 125° C. were hard, tough, mar- and print-resistant.

*Example 2.—Ten per cent of total carboxyl contributed by polymer*

|  | Grams |
|---|---|
| Polymer solution (41.7% solids in isopropyl ether) solids | 33.6 |
| Phthalic anhydride | 163.0 |
| Linseed monoglyceride | 177.0 |
| Glycerol, 98% | 58.5 |

The first three ingredients were stirred in an inert atmosphere and heated to 180° C. The glycerol was added, temperature brought to 200° C., and held for one hour. A reflux condenser with water separator in the return line was provided, and xylene added to give a moderate rate of reflux at 190° C. After four hours at this temperature, additional xylene was added to give a reflux temperature of 165° C.; fifty minutes at this temperature gave a material of gel test (as described in Example 1) of 12 seconds. Xylene and butanol were added to give an alkyd at 50 per cent solids, with 5 per cent butanol on solids, of color 9 Gardner, viscosity R Gardner-Holdt and acid value 8.62.

Films of this alkyd baked without drier for one hour at 125° C. were hard, tough, mar- and print-resistant.

*Example 3.—Polymer-modified oil*

An oil was prepared including the polymer as follows:

|  | Grams |
|---|---|
| Polymer (100% solids) | 56.0 |
| Linseed oil (superior) | 293.0 |
| Glycerol, 95% | 20.2 |
| Calcium naphthenate, 1% Ca | 1.6 |
| Xylene | 41.0 |

The mixture was refluxed with agitation in an inert atmosphere for eight hours (185°–190° C.) and with separating of water of esterification from the reflux return. Xylene was then removed by heating to 200° C. under 25" Hg vacuum for two hours. The product was an oil of viscosity C Gardner-Holdt, color 9 Gardner, and acid value 3.55.

This oil was then used in preparing an alkyd:

|  | Grams |
|---|---|
| Polymer-modified linseed oil (above) | 60.7 |
| Phthalic anhydride | 27.6 |
| Glycerol, 95% | 13.2 |
| Calcium naphthenate, 1% Ca | 1.0 |
| Xylene | 10.2 |

The polymer-modified linseed oil, glycerol, and calcium naphthenate were stirred at 210°–215° C. in an inert atmosphere for 3½ hours, after which time a sample diluted with 7.5 volumes of methanol remained clear. The phthalic anhydride and xylene were then added, and the mixture refluxed (with water separation) for six hours at 205° C. The product was an alkyd of acid value 1.45.

*Example 4.—Four hydroxyl alcohol*

| | Grams |
|---|---|
| Polymer solution (74% solids in diethyl ether) solids | 82.2 |
| Phthalic anhydride | 353.8 |
| Soya oil, alkali refined | 362.4 |
| Pentaerythritol | 256.0 |
| Calcium naphthenate, 5% Ca | 9.6 |

The soya oil and calcium naphthenate were well agitated in an inert atmosphere and brought to 230° C. A portion (119) of the pentaerythritol was added during 20 minutes, and the temperature raised to 230° C. This temperature was held until a sample thinned with 4½ volumes of pure methanol remained clear at 35° C. (6 hours). The phthalic anhydride and polymer were then added, 200° C. regained, and held for 15 minutes. The rest of the pentaerythritol was added, and 200° C. held for one hour. Xylene was added to give a reflux temperature of 190° C., water being removed from the reflux by means of a trap. After eighty minutes at 190° C., xylene was added to a reflux temperature of 165° C.; this was held about one hour for a gel test (as described in Example 1) of 13 seconds. Thinning with xylene and butanol (5 per cent butanol on solids) to 50 per cent solids gave an alkyd of viscosity Z–5 Gardner-Holdt, color 12 Gardner, and acid number 21.6. Films of this material baked ½ hour at 121° C. were tough, mar- and print-resistant, and completely through-dried even at 2–3 mils thickness.

*Example 5.—Aliphatic dicarboxylic acid*

| | Grams |
|---|---|
| Polymer solution (41.7% solids in isopropyl ether) solids | 56.0 |
| Adipic acid | 146.0 |
| Linseed monoglyceride | 177.0 |
| Glycerol, 98% | 56.3 |

The mixture was stirred in an inert atmosphere, heated to 200° C. Xylene was added to reflux at 190° C. with water separation, and this temperature held for 2 hours 39 minutes. A further addition of xylene brought the temperature to 165° C., which was held 19 minutes for a gel test (as described in Example 1) of 15 seconds. Xylene and butanol were added to produce a solution of 50 per cent solids containing 5 per cent butanol on solids, of viscosity S Gardner-Holdt, color 9 Gardner, and acid value 20.2.

*Example 6.—Absence of fatty acid*

| | Grams |
|---|---|
| Polymer solution (74.5% solids in xylene) solids | 200 |
| Adipic acid | 24.3 |
| Glycerol, 98% | 34.5 |
| Sulfuric acid | 2.0 |
| In methanol | 7.0 |

The polymer (67 per cent of total carboxyls), adipic acid and glycerol were stirred under an inert atmosphere in a glass-lined reactor and warmed to 90° C. The sulfuric acid solution was added, and the batch was refluxed at 103° C., water of esterification being continuously removed from the reflux by a separator; any rise in the reflux temperature above 140° C. was controlled by the addition of toluene. After 5.5 hours of refluxing the mass was thinned with toluene, 8 parts of sodium carbonate were added to neutralize the acid, and the solution was stirred and filtered. The solution had an acid value of 24.2. Without drier, an infra-red bake of 5 minutes gave a hard, dry film.

*Example 7.—Unsaturated dicarboxylic acid*

| | Grams |
|---|---|
| Polymer solution (59% solids in isopropyl ether) solids | 11.2 |
| Maleic anhydride | 29.4 |
| Linseed fatty acids | 84.0 |
| Trimethylolpropane | 49.1 |

The last three ingredients were stirred in an inert atmosphere and heated to 175° C. The polymeric ester was then added, and an amount of toluene sufficient to give a moderate reflux rate at 180° C. A water separator was included in the reflux return line. After three hours and thirteen minutes at 180° C., the batch was thinned with xylene to 55 per cent solids. Viscosity was H Gardner-Holdt, color 7 Gardner, and acid value was 17.0.

Films of this material flowed on glass and baked one hour at 125° C. were thoroughly cured, and superior in toughness to a comparable material prepared without the polymer.

*Example 8.—Cyclic dicarboxylic acid, mixed alcohols*

| | Grams |
|---|---|
| Polymer (20% solids in xylene) solids | 28.0 |
| $\Delta^4$-3,6 endomethylene tetrahydrophthalic anhydride (cyclopentadiene-maleic adduct) | 205.0 |
| Dehydrated castor oil | 220.0 |
| Glycerol, 98% | 77.3 |
| Ethylene glycol | 17.1 |

The oil and an ester-interchange catalyst (preferably 0.01% calcium as naphthenate) were heated to 230° C. under an inert atmosphere, and 30.5 parts of the glycerol were added with vigorous agitation. The mixture was reacted at 220° C. for one hour and allowed to cool, yielding a slightly hazy monoglyceride. The remaining ingredients were now charged, and the mass heated. Solvent introduced with the polymer was distilled off until the reaction temperature reached 180° C., and at this point the refluxing solvent was returned to the still after separation of water. Refluxing was continued for five hours, and then xylene and butanol (10% of the solids) were added and the mass further thinned with more xylene. The final viscosity was J+ (Gardner-Holdt), acid value 21.8 and color 6 (Gardner). A film with no drier addition cured in 0.5 hour at 121° C. (250° F.) to a tough, hard coating.

The foregoing examples have been selected as establishing the generality of the alkyd reaction in which the polymeric ester is included as the equivalent of a monobasic acid reactant. They show the effectiveness of the polymer as a substitute for part or all of a monobasic acid; both saturated and unsaturated and aliphatic and aromatic dicarboxylic acids are exemplified; mixture of di- and tri-hydric alcohols and tri- and tetra-hydric alcohols are disclosed, but higher alcohols such as arabitol, mannitol, sorbitol, etc. can be used instead, all of which contain no reactive groups, other than hydroxyl; and natural and modified oils, their acids and monoglycerides of the acids are illustrated. The polymeric esters are therefore of general utility in the alkyd or dibasic acid formulation.

What is claimed is:

1. Polyhydric alcohol mixed polymeric ester of an alkyd forming dicarboxylic acid and a polymeric reaction product of substantially equimolar proportions of ketene and an unsaturated aldehyde of the acrylic series selected from the group consisting of acrolein, crotonaldehyde, 2,4-hexadienal-1, octatrienal, and cinnamic aldehyde.

2. Mixed ester according to claim 1 in which the reaction product is present in amount to supply at least four per cent of the carboxylic charge calculated on the basis of a molecular weight equivalent to that of the ketene plus the aldehyde.

3. Mixed ester according to claim 1 having in addition a fatty oil acid reactant.

4. Mixed ester according to claim 1 in which the aldehyde is crotonaldehyde.

5. Mixed ester according to claim 1 in which the dibasic acid is phthalic anhydride.

6. Mixed ester according to claim 1 in which the alcohol is glycerol.

7. Process according to claim 12 in which the ketene-aldehyde reaction product is present in amount to supply at least four per cent of the carboxylic charge calculated on the basis of a molecular weight equivalent to that of the ketene plus the aldehyde.

8. Process according to claim 12 in which a fatty oil acid reactant is included.

9. Process according to claim 12 in which the aldehyde is crotonaldehyde.

10. Process according to claim 12 in which the dicarboxylic acid is phthalic anhydride.

11. Process according to claim 12 in which the alcohol is glycerol.

12. Process of preparing a mixed alkyd polyester which comprises reacting together a polyhydric alcohol having no reactive groups other than hydroxyl, an alkyd forming dicarboxylic acid and a polymeric substantially equimolar reaction product of ketene and an unsaturated aldehyde of the acrylic series selected from the group consisting of acrolein, crotonaldehyde, 2,4-hexadienal-1, octatrienal and cinnamic aldehyde, said reaction product having been prepared in the presence of a catalyst selected from the group consisting of Friedel-Crafts catalysts and activated clays containing hydrous aluminum silicate and at a low temperature between about −50° to +30° C.

LEON SHECHTER.
JOHN M. WHELAN, Jr.

REFERENCES CITED

The following references are of record in the file of this patent:

UNITED STATES PATENTS

| Number | Name | Date |
|---|---|---|
| 1,993,828 | Brubaker et al. | Mar. 12, 1935 |
| 2,421,976 | Agett | June 10, 1947 |